May 27, 1952 H. R. HOLMAN ET AL 2,598,544
DEVICE FOR OUTDOOR HEATING
Filed Feb. 24, 1950 3 Sheets-Sheet 1

INVENTORS
HARRY R. HOLMAN
BEALIE C. BARNES
BY

May 27, 1952     H. R. HOLMAN ET AL     2,598,544
DEVICE FOR OUTDOOR HEATING
Filed Feb. 24, 1950     3 Sheets-Sheet 2
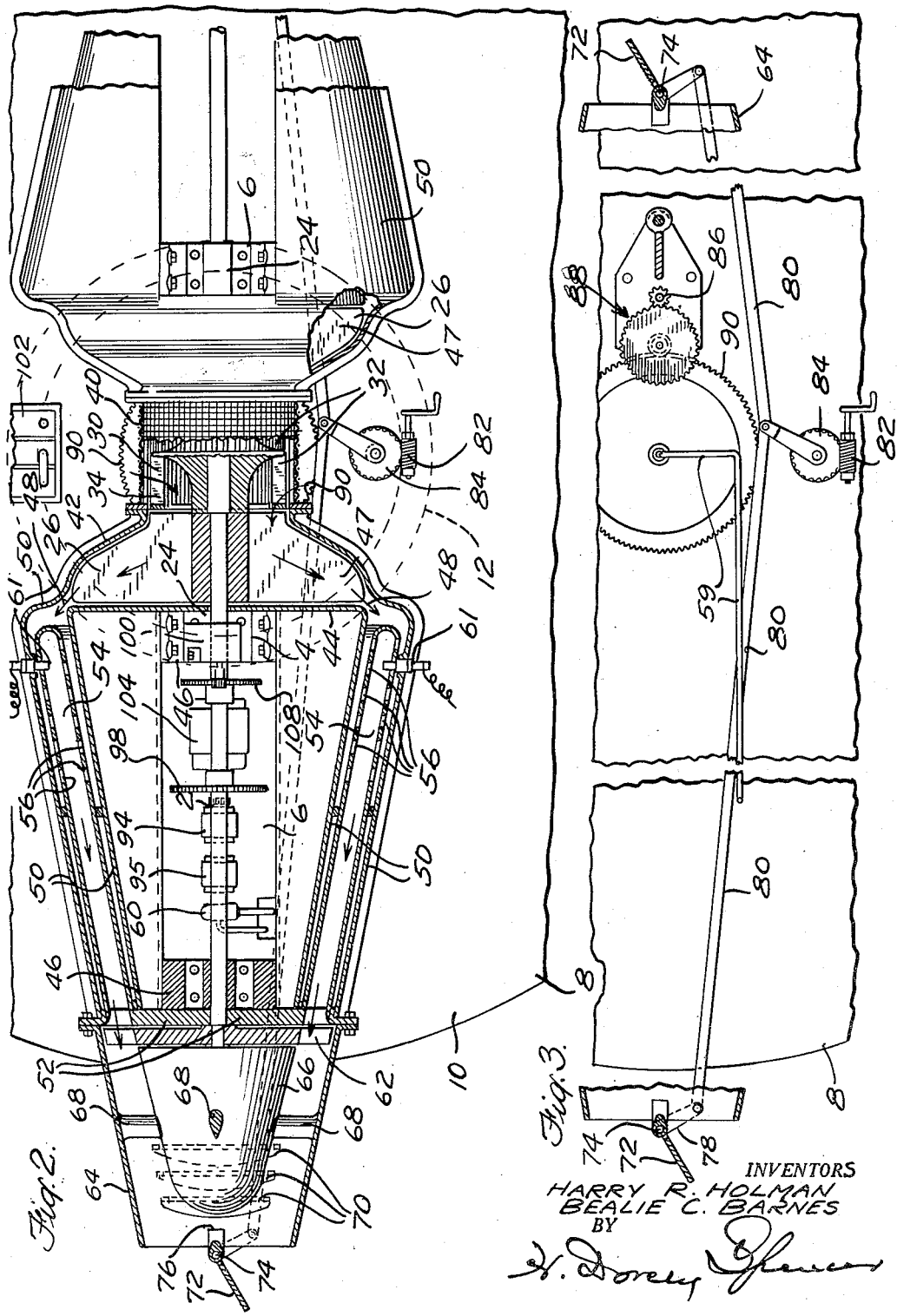
INVENTORS
HARRY R. HOLMAN
BEALIE C. BARNES
BY

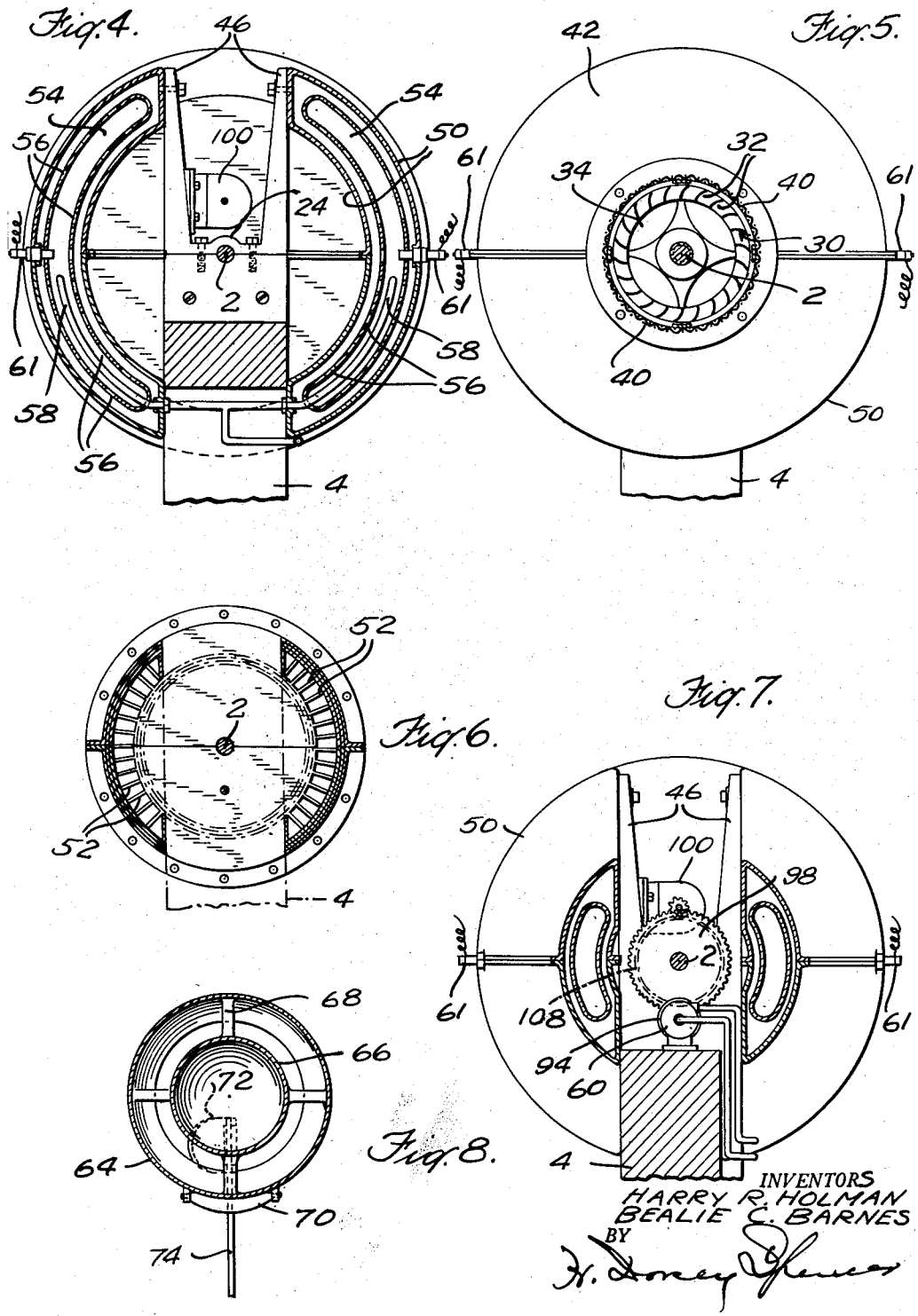

Patented May 27, 1952

2,598,544

UNITED STATES PATENT OFFICE 2,598,544

DEVICE FOR OUTDOOR HEATING

Harry R. Holman and Bealie C. Barnes,
Riverside, Calif.

Application February 24, 1950, Serial No. 146,102

15 Claims. (Cl. 47—2)

1

This invention relates to self-contained devices for producing and effecting the distribution of hot gases for outdoor heating purposes.

Although there has long been both a need and a demand for efficient, economical and compact outdoor heaters for use by farmers, orchardists, public utility companies and others to protect crops, livestock, outdoor public utilities, etc. from freezing temperatures, the heaters employed to date have usually comprised the radiation type of fuel burning heaters, such as smudge pots, or combinations of fuel burning heat plants with complicated machinery, driven from a separate power source, to circulate the heat produced. Both of these types of heater have been relatively inefficient, both from the standpoint of fuel economy, from the standpoint of effective circulation or distribution of the heat produced and, in the case of the smudge pot, from the standpoint of the inherent menace to health and property from the pall of smoke and soot brought about by the incomplete combustion of fuel in the smudge pot.

A particular object of the present invention is to provide a self-contained heater of such overall high efficiency that complete combustion of the fuel will be obtained and therefore substantially the maximum of heat will be produced from the fuel consumed and that a very high degree of efficiency will be obtained in the distribution of this heat to the points where it can most effectively perform its function. To this end the invention aims to provide a self-contained heater which is primarily directed to the efficient burning of a fuel, preferably a liquid fuel, to produce highly heated gases for heating purposes, but which incidentally extracts from said highly heated gases sufficient power both to insure complete and efficient combustion of the fuel and also to insure distribution and/or circulation of the hot gases. As above suggested, the invention aims particularly to create as much heat as possible by efficient combustion of as much fuel as possible within the limits of the apparatus dimensions, using only so much of the potential power developed by the expanding gases as may be required to drive a gas turbine for operating a compressor to supply air for efficient combustion and to effect the distribution of the heated gases to the points of use.

In contradistinction to gas turbines designed primarily for power development, as, for example, turbines designed either to drive propellers or to produce propulsion jets or both, the present invention is directed primarily to the

2 production of heat and not to the production of power applicable to uses outside the device itself. The invention is therefore directed to an apparatus that can operate efficiently for its purposes at higher temperatures than gas turbines used for power development and which, because of the small proportion of the heat developed which is applied to the production of power, can operate with greater tolerances than a device that is designed primarily for the production of power. Moreover, since low weight to power ratios are not important a wider choice of materials having high heat resistance is permitted in the construction of the apparatus.

An important feature of the invention is the design of the apparatus so that it is inherently stable and that any thrust which may be incidental to the distribution and/or circulation of its hot gases may always be compensated for by a counter thrust of equal intensity. This feature of the invention contributes particularly to the mounting of the apparatus upon a tower to insure better distribution of the heat, as, for example, in citrus or other orchards to prevent frost damage. Since the device of the present invention does not move through the air and therefore cannot depend for its efficiency of operation upon the ram effect at the air intake produced by such movement, another important feature of the invention is the provision of impeller means for supplying the compressors with the air to be compressed to insure an adequate supply for complete combustion and for the production of the hot gases to be distributed.

In order further to insure that the device shall be self-contained and, therefore, conveniently usable in all locations, sufficient additional power is taken from the expanding gases to provide for starting the device, as, for example, through a motor-generator and a storage battery, and also to operate a fuel injecting pump. It will be understood that, at the temperatures at which the device operates, ignition of the fuel through electrical connections will be required only when starting the device.

As hereinabove suggested, the device of the present invention is preferably so designed that it is inherently stable. To this end oppositely discharging compressors and turbines of substantially equal capacity are arranged on a common driving shaft, the stator and rotor blades of one turbine being so inclined in respect to those of the other that the two turbines exert driving torque on the shaft in the same direction. Not only does this arrangement which brings substantially equal reaction forces into operation against each other insure such stability and dynamic balance in the operating device as to facilitate its mounting for any use and particularly upon a tower for orchard use but it also eliminates the necessity for heavy, thrust type bearings for the shaft. Moreover the inherent stability of the design facilitates its mounting for rotation about a point midway between the compressors and turbines to permit distribution over a wide area from a single location.

An important feature of the invention is the mounting of adjustable rudder-type fins on the discharge ends of the tail pipes to bring about, by their reaction to the stream of gases into which they project, the rotation of the device when rotatably mounted. By reason of the counterbalancing of both the dynamic and gravity forces in respect to the axis of rotation only a comparatively light pressure of the discharging gases upon the rudder fins is required to effect the rotation of the device, these fins in no way interfering with the control of the direction of flow of the heated air to the area to be heated.

A feature of the invention is the provision of means for governing the speed of rotation of the device when it is being rotated on its support for the purposes aforementioned.

Another feature of the invention, when the device is mounted on a tower, as hereinabove suggested, is the utilization of the hollow interior of the tower as a storage tank for the fuel used in the operation of the device.

Other features of the invention are the use of louvres in the discharge pipes of the device to insure direction of a part of the discharged gases in other than coaxial directions, the location of all bearings outside the heat zones and the provision of removable bearing caps for permitting bodily lifting of the entire compressor, burner, turbine assembly out of its bearings in the support when said caps are removed and the novel combustion chamber construction which contributes to the rapid and complete combustion of the fuel.

Still other features, objects and advantages of the invention, to which reference has not hereinabove specifically been made, will appear hereinafter when the following description and claims are considered in connection with the accompanying drawings, in which—

Figure 1 is a side elevation, partly in section and with parts broken away to permit other parts to be shown on a larger scale and also with parts broken away to show the inner structure, of an embodiment of the invention in which the self-contained device for producing and effecting the distribution of hot gases for outdoor heating purposes is mounted upon a tower to facilitate distribution of the hot gases in orchards;

Figure 2 is a section on the line 2—2 of Figure 1;

Figure 3 is a section on the line 3—3 of Figure 1 showing the pin adjusting mechanism;

Figure 4 is a section on the line 4—4 of Figure 1 through the burners, this view showing the arrangement of the combustion chambers and the surrounding air jackets which receive the compressed air from the compressor;

Figure 5 is a section on the line 5—5 of Figure 1 through the impeller;

Figure 6 is a section on the line 6—6 of Figure 1 looking toward the turbine stator;

Figure 7 is a section on the line 7—7 of Figure 1 looking toward the compressor;

Figure 8 is a section on the line 8—8 of Figure 1 looking toward the discharge end of the device.

Figure 1:
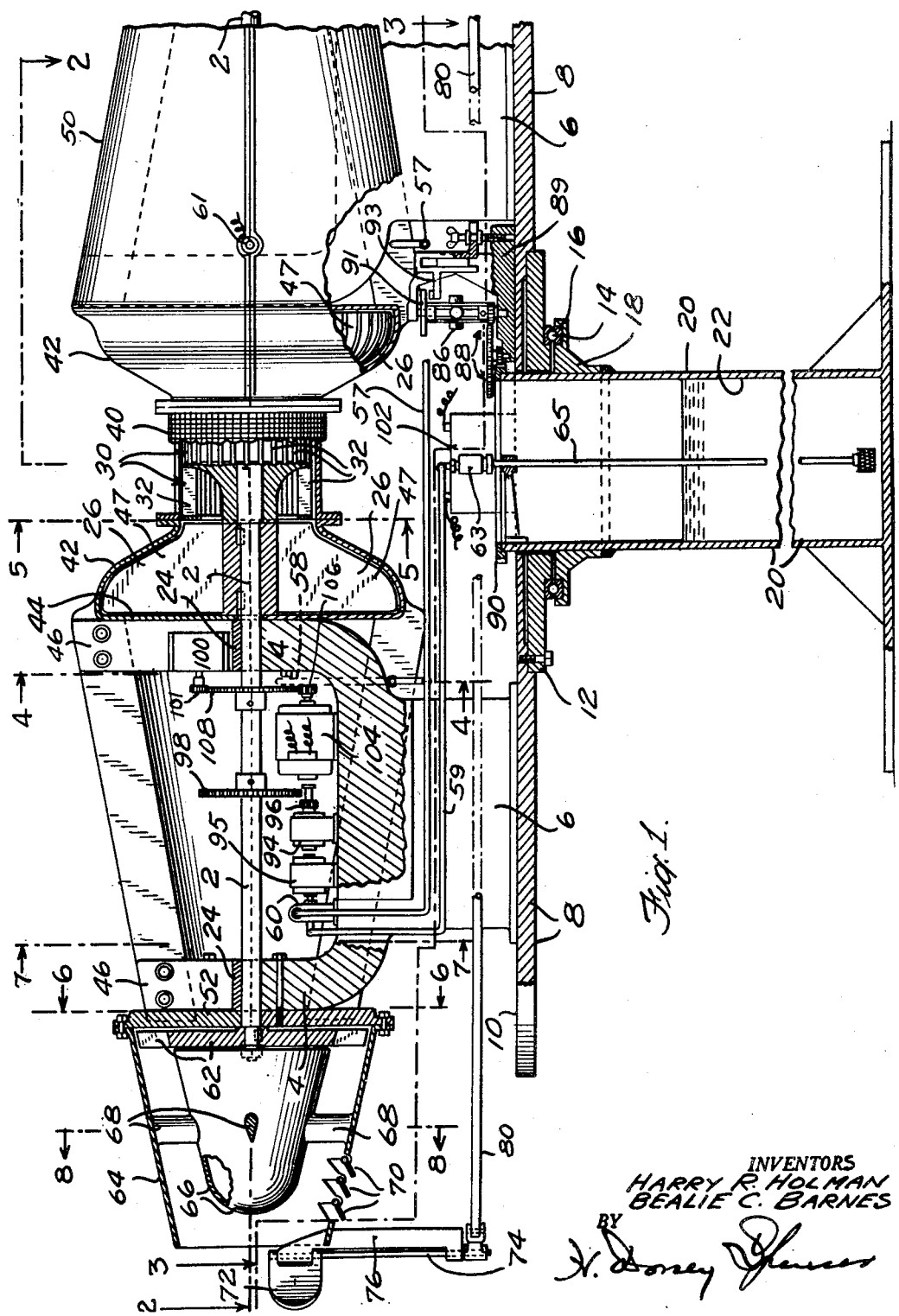

In the illustrative embodiment of the invention, which shows the device for producing and distributing hot gases for outdoor heating mounted upon a tower so that it is elevated above the ground to facilitate the proper distribution of the gases in orchards or the like, the main shaft 2 is shown as mounted in bearings 4 carried by pedestals 6, in turn carried upon a platform 8 of suitable length to accommodate the pedestals and of a width sufficient to provide a catwalk 10 for use in inspecting and servicing the device. In the illustrative embodiment the platform 8 has attached to its under side a plate 12 having on its bottom face a raceway to receive ball or roller bearings 14 traveling in a stationary raceway 16 carried by a tower collar 18 near the upper end of a tubular tower 20, whereby the platform 8 and the parts carried thereby may turn upon the tower 20. The tower 20 is so constructed that it has within it a storage space or reservoir 22 for the liquid fuel to be burned in the production of the hot gases.

It will be noted that there are four of the bearings 4 for the shaft 2 and that each bearing is provided with a removable cap 24 which, when all are removed, permits the entire assembly of air impeller, air compressors, burners, turbines and tail pipes to be lifted out of the pedestal bearings 4 and off from the pedestals 6 for replacement by another unit, in the event of temporary failure of a unit. Each hot gas producing and distributing device preferably consists, as shown, of two oppositely discharging compressors, each having associated therewith a turbine, also discharging in a direction opposite to that of the other turbine so that any thrust forces produced by the discharge of the hot gases react against each other, the capacities of the respective compressors and turbines being such that the forces reacting against each other are substantially equal. This eliminates any necessity for bracing the tower 20 against the reactions from the discharge of the hot gases.

As herein shown there are two compressors 26 discharging in opposite directions and having their air intakes connected to opposite ends of a common impeller 30 located between them. As shown in Figure 5, the impeller 30 has blades 32 so inclined that, as the impeller rotates, it draws air into its interior 34 and discharges it at its two ends into the intakes of the respective compressors 26. To prevent the intake of foreign matter into the impeller casing its cylindrical outer surface is preferably covered with a screen 40. A separator 41 insures equality of the air supply to the two compressors.

The compressors 26 may be for the most part of usual construction, each being provided with a housing 42 having an end wall 44 connected to a torque lug 46 carried by or formed integral with the bearing cap 24, the purpose of the torque lug being to resist any tendency of the housing 42 to turn with the blade-carrying compressor wheels 47. The torque lugs may also support the burners and the turbine stators. Each of the compressor wheels 47 of the two compressors 26 is attached to the shaft 2 and is driven thereby as hereinafter more fully set forth.

The air compressed in each of the compressors 26 is discharged through openings 48 in the housing 42 which communicate with the interiors of the jackets 50 of the burners, each of these jackets 50 being transversely curved to fit the curvature of the housings 42 and extending from the housings 42 to the stators 52 of the gas turbines, hereinafter to be more fully described. The jackets taper somewhat from their points of connection to the compressor housing 42 to the ends where they are connected to the stator 52 in order to compensate for the smaller diameter of the stator 52. This taper also contributes to the distribution of the air to the more remote openings of the combustion chamber now to be described and to the velocity of the gases discharged therefrom. Located within the jackets 50 of the burners are combustion chambers 54 the bounding walls of which are provided with numerous intake openings 56 through which the compressed air in the jackets 50 may pass to enter the combustion chambers and mix with the liquid fuel injected thereinto in the form of a spray through the fuel injectors 58 connected by pipes 57 with the fuel pressure pump 60 which in turn is connected by pipe 59, stuffing box 63 and pipe 65 with the fuel tank or reservoir 22 in the tower 20, the stuffing box 63 permitting the turning of pipe 59 about the axis of pipe 65 as the platform 8 rotates.

In the illustrative embodiment of the invention the fuel injectors 58 are located in the lower parts of the burners. Entering the burners through their side walls and projecting into the combustion chambers 54 are ignition or spark plugs 61, preferably of the glow type, both the plugs 61 and the injectors 58 being preferably located adjacent to the ends of the combustion chambers 54 which are near the air intakes into the jackets 50 and the plugs 61 and injectors 58 being preferably substantially directly adjacent to each other.

The combustion chambers 54 have their discharge ends arranged to discharge directly into the blades of the stators 52, the blades of the stators 52 being inclined in a direction opposite to the direction of inclination of the blades of the turbine rotors 62 and the rotors 62 being connected to the shaft 2 to drive this shaft and thereby drive both the compressors 26 and the impeller 30. Since the rotors 62 of both turbines are directly connected to the shaft 2 it will be understood that the blades of the right hand stator 52 will be inclined in the other direction in respect to the blades of the left hand stator 52 and that there will be a corresponding difference in the inclinations of the associated rotors 62, so that the torque applied by each turbine to the shaft 2 will be in the same sense.

To assist in directing the hot gases discharged from the turbines into the desired areas to be heated, a tail pipe 64 is connected to the discharge side of each turbine and located in each tail pipe is a flow directing cone 66, preferably somewhat streamlined, this cone serving to reduce any tendency to the setting up of vortical or eddy movements in the discharged gases and to increase the speed of flow of the discharging gases. The cone 66 may be maintained in central position in the tail pipe 64 by means of braces 68, preferably streamlined in cross section.

As will usually be the case when the device herein shown is used for frost prevention in orchards, it is desirable that some of the discharged gases be directed downwardly toward the ground. To provide for this in the illustrative embodiment of the invention the tail pipe 64 is provided with louvres 70 on its lower side which may be opened more or less to direct a portion of the stream of gases discharged through the tail pipe toward the ground. Any suitable louvre adjusting means may be connected to the louvres 70 for this purpose.

To effect turning of the hot gas producing and distributing device about the axis of its bearings on the tower 20, a small vane, tab or fin 72 may be mounted upon the end of each tail pipe 64 so that it projects into the stream of gases discharged from the tail pipe, the fin being preferably so mounted on a shaft 74, having its bearing in a bracket 76 attached to the tail pipe 64, that the fin may be turned to various angles to the direction of flow of the stream of gases discharged from the tail pipe. Any suitable turning or adjusting means may be provided for this purpose such as the crank 78 on the shaft 74 connected by a link 80 to a worm and worm gear arrangement 82—84 by which the links 80 for the cranks 78 operating the fins 72 of the two tail pipes 64 may be adjusted simultaneously to the same angular position, this position, as will be obvious, determining to some extent the speed of rotation of the device on its bearings on the tower 20.

To avoid too rapid rotation of the device under the action of the fins 72, any suitable speed governing means may be provided, such, for example, as the centrifugally operated brake-applying governor 86 driven from a gear train 88 having its bearings in a plate 89 attached to the platform 8 and meshing with a stationary gear 90 carried by the upper end of the tower 20 which projects above the platform 8. The governor 86, as its speed increases pulls down a friction disc 91 into engagement with a cooperating vertically adjustable padded arm 93, the retarding friction thus produced reacting through the gear train 88 upon the fixed gear 90 to retard the rotation of the platform 8.

In order to effect the starting of the device, a starting motor 94 mounted upon one of the pedestals 6 has a pinion 96 upon its driving shaft which may be brought into mesh with a gear 98 upon the shaft 2 so that when the motor 94 is energized the shaft 2 will be turned to cause the impeller 30 and the compressors 26 to supply air to the burners. At the same time that the circuit is closed which energizes the starting motor 94, a circuit is closed through the motor 95 that drives the fuel pressure pump 60 and a circuit is also closed which includes the ignition or spark plugs 61. The compressed air from the compressors 26 entering the jackets 50 of the burners passes through the openings 56 in the walls of the combustion chambers 54 and there meets the fuel injected into the combustion chambers through the injection nozzles 58, thus forming a combustible mixture which is immediately ignited by the ignition plug 61, the hot gaseous products of the combustion of the fuel in the chambers 54 being forced through the stators 52 and turbine wheels 62 to apply turning torque to the shaft 2, the heated gas mass being then exhausted through the tailpieces 64.

The starting motor 94 remains connected to the driving shaft 2 only so long as is necessary to insure, with the assistance of the turbines, the raising of the speed of rotation of this shaft to the required R. P. M. and until continuous combustion can take place without the aid of the ignition plug 61. When this point has been reached the heating device becomes self-operating and the starter is disengaged and the spark plugs are cut out. Such disengagement of the starting motor may be effected either through the common overrunning clutch or manually after the operator has observed by means of a tachometer 100, connected to the shaft 2 through pinion 101 and gear 108, when the desired speed of rotation has been obtained. Manual cutting out of the spark plugs may also then be effected. It is, of course, also practicable to provide thermostatic control of the disconnection of the starting motor and spark plugs, making this disconnection dependent upon the reaching of a certain temperature in the gas stream.

In order that the device may be self-contained, the starting current, the current for the plugs 61 and the current for operating the pump motor 95 are preferably all supplied from a storage battery 102 which is kept charged by its connections to a generator 104, also mounted on the same pedestal 6 on which the starting motor 94 is mounted, the generator 104 having a gear 106 on its driven shaft meshing with a pinion 108 on the shaft 2.

Although the invention is herein shown as embodied in a structure highly practicable for the purposes for which it is intended, it will be understood that the invention is not restricted to the illustrative embodiment and that many different embodiments may be made without departing from the spirit of the invention, the scope of which is defined in the appended claims.

Although the mounting of the device upon a tower, which may be either portable or stationary, has its advantages in frost prevention in orchards and similar situations, it will be apparent that there are many other uses of the device where such mounting would be neither necessary nor desirable.

What is claimed as new is:

1. A self-contained device for producing and effecting the distribution of hot gases for outdoor heating purposes having, in combination, a combustion chamber, means for injecting a fluid fuel into said combustion chamber, means, including an air compressor and intake openings in said combustion chamber wall distributed both lengthwise and transversely over a substantial portion thereof, for introducing combustion sustaining air into said combustion chamber along and about the path of travel of the injected fuel therethrough, and a gas turbine having a driving connection to said compressor, said turbine including a stator located at one end of said combustion chamber and into which the hot gaseous products of the combustion immediately discharge.

2. In a self-contained device for producing and effecting the distribution of hot gases for outdoor heating purposes the combination with a combustion chamber, means for injecting a fluid fuel into said combustion chamber, means, including an air compressor and an intake into said combustion chamber, for introducing combustion sustaining air into said combustion chamber, a gas turbine having a driving connection to said compressor, said turbine including a stator located at one end of said combustion chamber and into which the hot gaseous products of the combustion are immediately discharged, of an impeller, also driven from the gas turbine, for supplying air to the compressor.

3. In a self-contained device for producing and effecting the distribution of hot gases for outdoor heating purposes, the combination with a combustion chamber, means for injecting a fluid fuel into said combustion chamber, means, including an air compressor and an intake into said combustion chamber, for introducing combustion sustaining air into said combustion chamber, a gas turbine having a driving connection to said compressor, said turbine including a stator located at one end of said combustion chamber and into which the hot gaseous products of the combustion are immediately discharged, of a jacket surrounding the combustion chamber and through which the compressed combustion-sustaining air travels in heat-exchanging relation to the chamber wall before its introduction into said chamber.

4. A self-contained device for producing and effecting the distribution of hot gases for outdoor heating purposes having, in combination, oppositely discharging air compressors and gas turbines which have common shafts and suitable means for introducing a combustible fuel into the streams of air discharging from said compressors, for effecting the combustion thereof and for directing the products of combustion to said gas turbines, the stator and rotor blades of one turbine being so inclined in relation to those of the other as to insure the application by said turbines of cooperative turning torques to the common shaft.

5. A device for producing and distributing hot gases according to claim 4 in which an impeller, driven from the common shaft and located between the two compressors, supplies air to each of said compressors.

6. A device for producing and distributing hot gases according to claim 4 in which each turbine is provided with a gas discharge pipe so directed that the discharge reactions of the two pipes tend to counterbalance each other.

7. A device for producing and distributing hot gases according to claim 4 having a support upon which the oppositely discharging compressors and turbines are mounted to turn about a vertical axis located midway between them.

8. A self-contained device for producing and effecting the distribution of hot gases for outdoor heating purposes having, in combination, oppositely discharging compressors and gas turbines which have a common shaft and a combustion chamber and a fuel injector therefor between each compressor and its associated turbine, the stator and rotor blades of each turbine being so inclined in respect to those of the other as to insure the application of cooperative driving torques to the common shaft.

9. A device for producing and distributing hot gases according to claim 8 in which an impeller, driven from the common shaft and located between the two compressors, supplies air to each of said compressors.

10. A device for producing and distributing hot gases according to claim 8 in which each turbine is provided with a gas discharge pipe so directed that the discharge reactions of the two pipes tend to counterbalance each other.

11. A device for producing and distributing hot gases according to claim 8 in which a support is provided with bearings upon which the device is mounted to turn about a vertical axis located substantially midway between the compressors.

12. A device for producing and distributing hot gases according to claim 11 in which a fin carried by the device and projecting into the stream of discharged gases has provision for adjustment to such an angle to said stream as to exert turning torque about the vertical axis.

13. A device for producing and distributing hot gases according to claim 11 in which each turbine is provided with a tail pipe through which the hot gases are discharged and in which a fin adjustably mounted on each tail pipe projects into the gas stream from said pipe, means being provided to hold said fins in different angular relations to the direction of flow of the discharged gases to exert different degrees of turning torque about the vertical axis.

14. A device for producing and distributing hot gases according to claim 11 in which the support is constituted by a portable tower having formed therewithin a supply tank for the fuel to be burned.

15. A device for producing and distributing hot gases according to claim 11 in which fins projecting into the streams of discharged gases are adjustably mounted on the device to exert more or less turning torque about the vertical axis and a governor for controlling the speed of turning of the assembly about the vertical axis is carried by the assembly and is driven by gear connections between the assembly and the stationary support.

HARRY R. HOLMAN.
BEALIE C. BARNES.

REFERENCES CITED

The following references are of record in the file of this patent:

FOREIGN PATENTS

| Number | Country | Date |
|--------|---------|------|
| 581,217 | Great Britain | Oct. 4, 1946 |